(12) United States Patent
Kameswaran et al.

(10) Patent No.: US 12,737,355 B2
(45) Date of Patent: Sep. 15, 2026

(54) QUERY OPTIMIZER SYSTEM FOR HETEROGENOUS DATABASE COMPUTING

(71) Applicant: International Business Machines Corporation, Armonk, NY (US)

(72) Inventors: Sowmya Kameswaran, San Jose, CA (US); Xu Qin Zhao, Beijing (CN); Ye Tao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/001,858

(22) Filed: Dec. 26, 2024

(65) Prior Publication Data

US 2026/0187065 A1 Jul. 2, 2026

(51) Int. Cl.
*G06F 16/2453* (2019.01)

(52) U.S. Cl.
CPC .. *G06F 16/24532* (2019.01); *G06F 16/24535* (2019.01)

(58) Field of Classification Search
None
See application file for complete search history.

(56) References Cited

U.S. PATENT DOCUMENTS 6,353,818 B1 * 3/2002 Carino, Jr. ........ G06F 16/24542
11,403,282 B1 8/2022 Waas et al.
11,868,359 B2 1/2024 Saxena et al.
11,880,365 B2 1/2024 Raghavan et al.
11,907,220 B2 2/2024 Chakra et al.
2003/0229652 A1 * 12/2003 Bakalash .......... G06F 16/24556
2013/0117305 A1 * 5/2013 Varakin ............. G06F 16/24569 707/769
2016/0140176 A1 5/2016 Chamberlin et al.
2017/0116288 A1 4/2017 Alpers et al.
2018/0075085 A1 * 3/2018 Brodt ................ G06F 16/24542
2019/0325055 A1 * 10/2019 Lee ..................... G06F 16/1734
2019/0347342 A1 11/2019 Kameswaran et al.
2020/0081903 A1 * 3/2020 Leach ............... G06F 16/24532
2022/0164351 A1 * 5/2022 Chen ....................... G06F 16/27
2024/0037115 A1 * 2/2024 Simanjuntak ......... G06F 16/245

* cited by examiner

*Primary Examiner* — Son T Hoang

(74) *Attorney, Agent, or Firm* — CANTOR COLBURN LLP; Stephen Yoder

(57) ABSTRACT

A computer-implemented method for processing database queries includes receiving a query at a query optimizer. A suitability of a plurality of specialized processors for executing the query in a first parallel process is determined, and a suitability of a plurality of specialized database management systems (DBMS) for processing the query in a second parallel process is determined. The suitable specialized processors and the suitable specialized database management systems with the query are correlated using an analytics accelerator. A specialized DBMS and a specialized processor as a recommendation to a primary DBMS is output.

20 Claims, 3 Drawing Sheets

FIG. 3

QUERY OPTIMIZER SYSTEM FOR HETEROGENOUS DATABASE COMPUTING

BACKGROUND

The present invention generally relates to query optimization systems, and more specifically to a query optimization system in a heterogenous computing database.

Relational databases are used to store and manage sets of interrelated data. The stored data can be accessed by providing a query to a database management system managing the database. Queries are typically formatted using a structured query language (SQL), or similar query structure, with the query being interpretable by the database management system. The database management system responds to the query by retrieving the relevant data from the database and providing the relevant data to the user.

SUMMARY

Embodiments of the present invention are directed to a computer-implemented method for optimizing processing of database queries. A non-limiting example of the computer-implemented method includes receiving a query at a query optimizer. A suitability of a plurality of specialized processors for executing the query in a first parallel process is determined, and a suitability of a plurality of specialized database management systems (DBMS) for processing the query in a second parallel process is determined. The suitable specialized processors and the suitable specialized database management systems with the query are correlated using an analytics accelerator. A specialized DBMS and a specialized processor as a recommendation to a primary DBMS is output.

Embodiments of the present invention are further directed to a system and process for the same Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a process for optimizing query processing in a database management system including specialized database query processing features.

Figure 1:
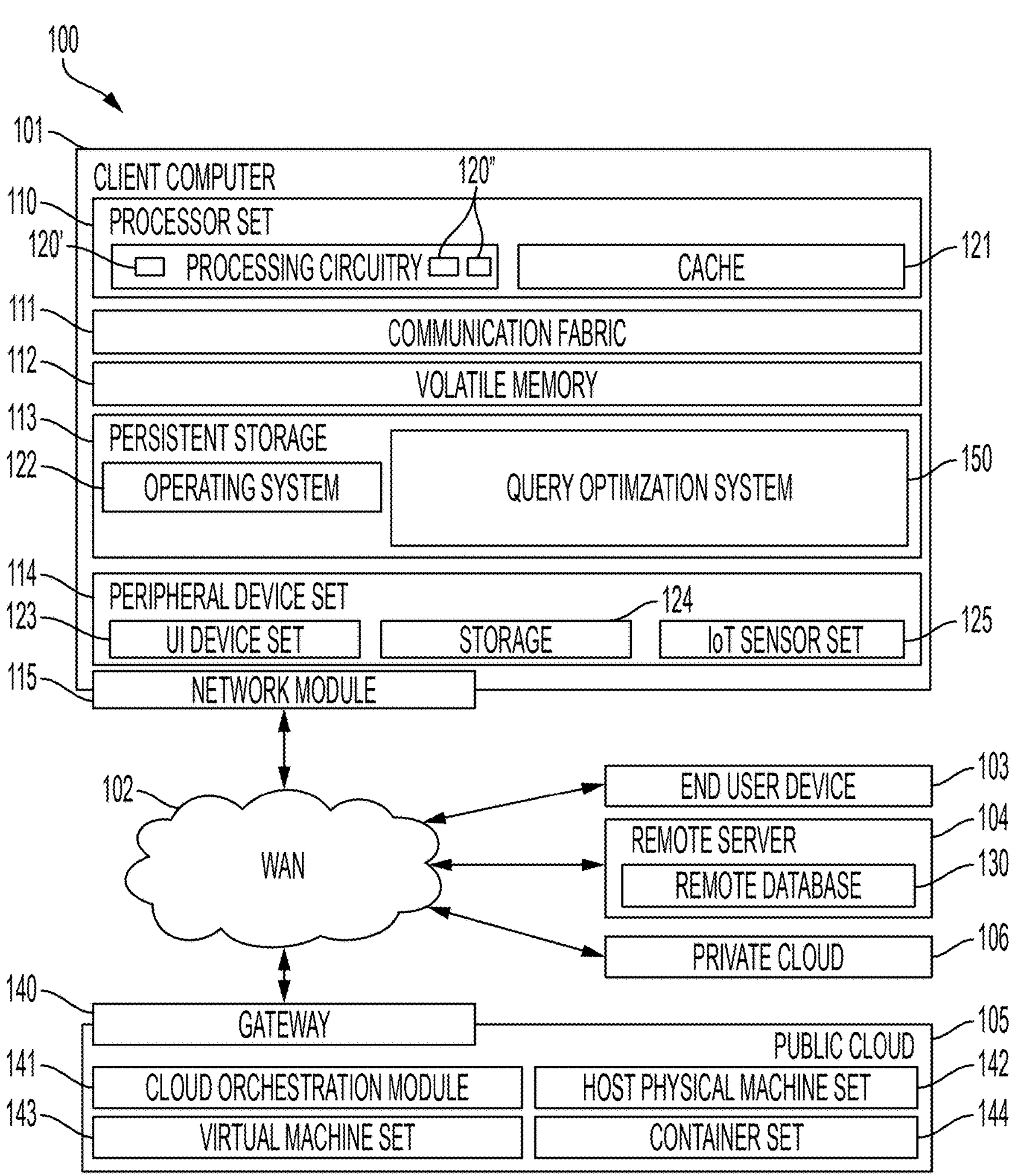
FIG. 1 depicts one exemplary cloud computing system configured to implement the system and method according to one embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Computing environment 100 contains an example of an environment for the execution of at least some of the computer code involved in performing the inventive methods, such as optimizing a query using a query optimization system at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 130. Public Cloud 105 includes gateway 140, Cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. In one example the processing circuitry 120 includes a general processor 120' and multiple specialized secondary processors 120" which are optimized for processing one or more subsets of database query types. It is understood that practical implementations are not limited to the exemplary general processor 120' and multiple specialized processors 120" and may include other processor configurations able to achieve similar operations. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 141. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Turning now to an overview of technologies that are more specifically relevant to aspects of the invention, query optimization systems are particularly beneficial where primary transactional database management systems (DBMS) and secondary analytical DBMS (referred to as specialized DBMS) are operated in conjunction using a primary general processor and secondary specialized processors. While referred to generically herein as database management systems (DBMS), it is appreciated that the DBMS are relational database management systems.

Figure 2:
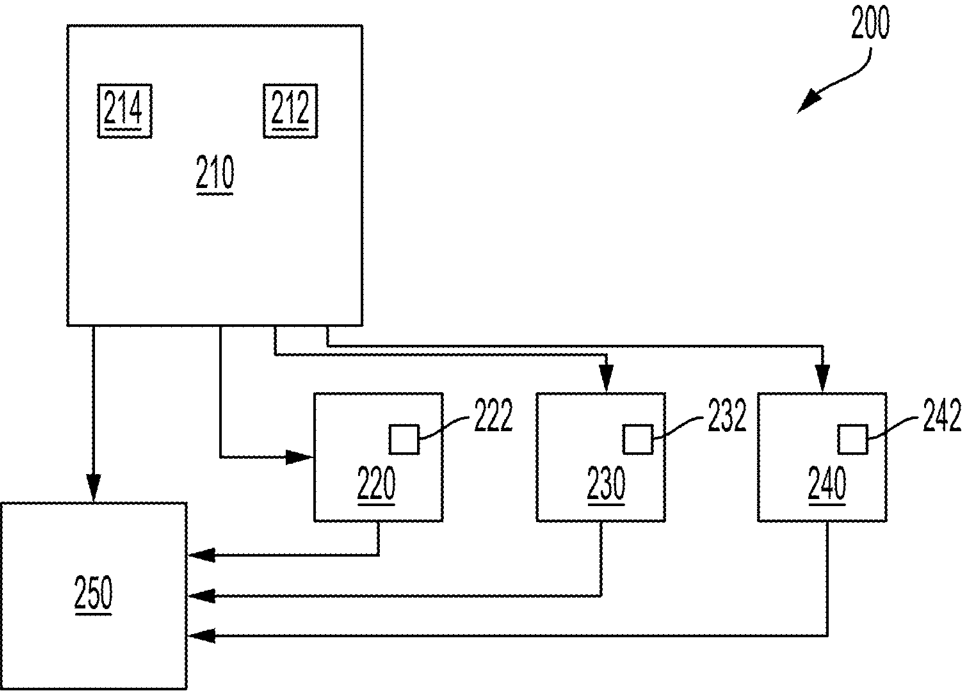
FIG. 2 depicts a high-level database management system architecture.

FIG. 2 illustrates a high-level database management system architecture 200 including a general DBMS (referred to as the primary DBMS 210), and three specialized DBMS 220, 230, 240 (referred to collectively as specialized DBMS). Each of the DBMS 210, 220, 230, 240 includes a corresponding processor 212, 222, 232, 242 with each specialized DBMS 220, 230, 240 including a similarly specialized processor 222, 232, 242. The DBMS 210, 220, 230, 240 are connected to a relational database 250 storing interrelated data. In alternate configurations, the specialized processors 222, 232, 242 may be separate from the specialized DBMS 220, 230, 240 and the processes described herein remains applicable.

Each of the specialized DBMS 220, 230, 240 and the specialized processors 222, 232, 234 is configured to optimally process a subset of query types. In some examples, the specialized DBMS 220, 230, 240 or specialized processors 222, 232, 242 may process other query types less efficiently. In other examples, one or more of the specialized DBMS 220, 230, 240 or specialized processors 222, 232, 242 is configured to only process the types of queries that the specialized DBMS 220, 230, 240 or specialized processors 222, 232, 242 is specialized for.

The DBMS 210, 220, 230, 240 are arranged as a heterogeneous database system. A heterogeneous database system is an automated (or semi-automated) system for the integration of heterogeneous, disparate database management systems to present a user with a single, unified query interface. As such, a user making a query provides the query at a single query input (referred to as a collector), and the DBMS 210, 220, 230, 240 are arranged to parse the query and provide the query to the appropriate DBMS 210, 220, 230, 240 for processing using an optimization process 300 (illustrated in, and described below with regards to, FIG. 3).

Queries in structured query languages (SQLs) are issued to relational database management systems in order to fetch data of interest. Multi-faceted tuning of the SQL queries ensures that the queries are processed by the most optimal DBMS 210, 220, 230, 240 and is helpful in providing for optimal data fetch performance in the heterogenous database configuration.

The heterogeneity of the DBMS is typically transparent to the end user because heterogeneous databases automatically distribute a data fetch task to the proper processing components (e.g. specialized processors 222, 232, 242 and/or specialized DBMS 220, 230, 240). However, automatic distribution can typically only be done based on certain rules-based conditions (e.g., the query, the data, etc.). In some cases, minor tweaks to the query execution patterns can provide substantial improvements in database performance including, but not limited to, faster fetch operations (retrieval of data) and decreased processor usage for any given fetch operation.

When tuning a single query, or a workload (group) of queries, one aspect that is considered is the ability of the SQL statements to be executed using a primary transactional DBMS 210 or on a secondary analytical DBMS (e.g., specialized DBMS 220, 230, 240), where such is available, as well as how efficiently the query or workload of queries can be executed. Utilizing the more efficient DBMS 220, 230, 240 allows the execution of the queries to be accelerated. The assignment of a query to a given DBMS 210, 220, 230, 240 to execute the query or a workload of queries is based on multiple statistics related to the data entries (referred to as objects) referenced by the query as executed on the primary transactional DBMS 210. The statistics are gathered in a query optimization process 300 using a query optimizer. The query optimizer is typically a software module stored within, and operated by, the primary DBMS 210. In alternate implementations the query optimizer 14 may be stored and operated elsewhere in a computer system and is not required to be a portion of the primary DBMS 210.

Another factor that is considered when assigning a query to be executed is the physical processor on which the operating system executes the query. In cases where the primary transactional DBMS 210 detects the presence of additional specialized secondary processors 222, 232, 242 which coexist with the main processors 212 (as is also the case of processing circuitry 120, described with regards to FIG. 1), a query optimizer 214 within the primary transaction DBMS 210 receives each query or workload of queries and is able to mark the query or workload of queries as eligible for processing using one of the identified specialized secondary processors 222, 232, 242.

When assigning queries to appropriate DBMS and/or processors it is beneficial to process and externalize information based at least in part on if, and why, a query is eligible for execution in a specialized DBMS 220, 230, 240. This information is used to optimize queries and applications that execute these queries by making use of the specialized processors 222, 232, 234 as well as detecting the eligibility of the specialized DBMS 220, 230, 240. Detecting the eligibility of the specialized DBMS 220, 230, 240 also involves making the data for the referenced objects in the query available on the specialized DBMS 220, 230, 240.

In the example of FIG. 2, the primary transactional DBMS 210 serves as a master data source and is connected to a database 250. User applications query the primary transactional DBMS 210 to read data from the database 250. The specialized DBMS 220, 230, 240, and the corresponding specialized processors 222, 232, 242 are designed and configured to execute certain subsets of queries on the database 250 with more efficiency than the primary transactional DBMS 210. Use of the specialized DBMS 220, 230, 240 reduces the overall execution time required for perform a database query.

Some existing systems include functionality to tune SQL statements (the structure of the query itself) for more efficient processing and can include strict rules-based metrics for assigning certain queries and query workloads to specialized DBMS (such as the specialized DBMS 220, 230, 240). However, the existing rules-based metrics do not consider all relevant factors, and certain queries or query workloads that could otherwise be performed be a relevant specialized DMBS 220, 230, 240 are kept at the primary transactional DBMS 210 resulting in less efficient query processing. Furthermore, the existing systems cannot factor in specialized processors, such as the specialized processors 222, 232, 242.

Figure 3:
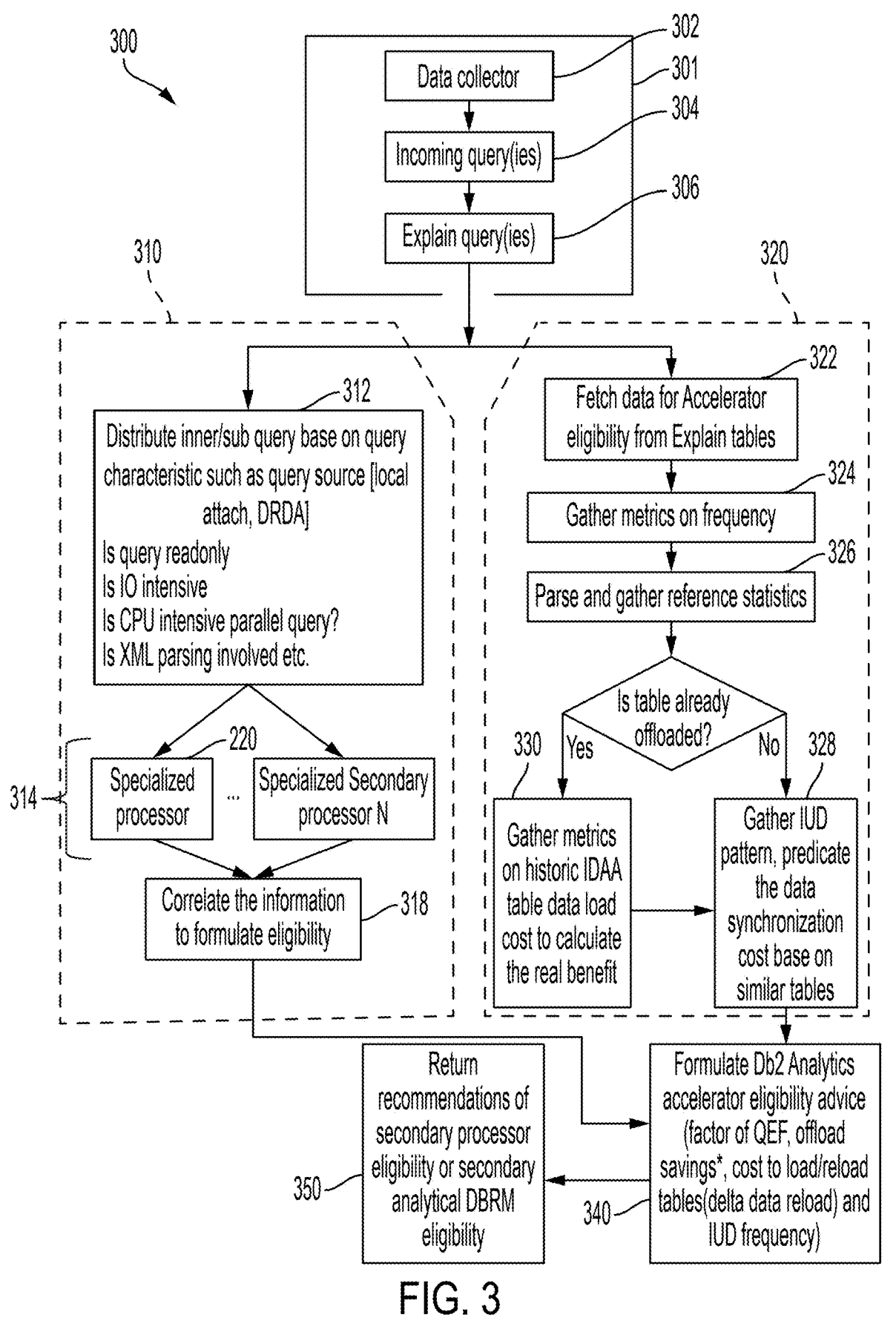

With continued reference to FIGS. 1 and 2, FIG. 3 illustrates a process 300 operated by the query optimizer 214 of FIG. 2. The process 300 tunes SQL queries, or workloads of queries, received at the primary transactional DBMS 210 and, when appropriate, assigns those queries or workloads of queries to be executed by specialized DBMS 220, 230, 240 and/or to be processed using the specialized processors 222, 232, 242. The process 300 improves on the previous rules-based assignments by taking into consideration the availability of physical processors and the eligibility of the queries to run on the specialized processors 222, 232, 242 configured to more efficiently process certain types of queries.

In the process 300, a data collector 302 in the query optimizer 214 receives incoming queries and collects information about the incoming queries 304. Queries 304 able to execute on the specialized DBMS 220, 230, 240 and/or processed using specialized processors 222, 232, 242 are fetched from source tables of the primary transactional DBMS 210, where the queries execute by default. For each collected query, the primary transactional DBMS 210 parses the query and gathers access path information in an explain queries step 306. The access path is evaluated by DBMS 210. The access path information is a process path by which the query will be processed in order to identify relevant data within the database 250.

For each query in the set of queries received at the data collector 302, a pair of parallel processes 310, 320 are operated. The first parallel process 310 determines if any suitable specialized processors 222, 232, 242 are available. The second parallel process 320 determines if any specialized DBMS 220, 230, 240 are appropriate for executing the query. As part of this analysis, the parallel process 310, 320 parse and gather information about possible subqueries or inner queries within the query and about the availability of additional processors (e.g. specialized processors 220, 230, 240). In addition, the parallel processes 310, 320 identify a source of the query. Identifying the source of the query assists in determining eligibility of the specialized DBMS 220, 230, 240 and the corresponding specialized processors 222, 232, 242.

The first parallel process 310 initially distributes the query into inner or sub queries based on predetermined query characteristics such as query source (e.g. physical location), whether the query is read only, whether the query is input/output (IO) intensive, whether the query is CPU intensive, whether the query utilizes XML parsing, or any similar characteristics that impact the ability of a specialized processor 222, 232, 242 to process the query at a query processing step 312.

Once the information is parsed, the query optimizer uses the first parallel process 310 determines the eligibility of the query to be processed on one or more of the specialized processors 222, 232, 242 by comparing the parsed information to each specialized processor 222, 232, 242 in a comparison step 314, and determines which specialized processors 222, 232, 242 are capable of handling the sub queries and/or inner queries. Each specialized processor 222, 232, 242 able to process the sub query or inner query is correlated with the sub query or inner query in a correlate information to formulate eligibility step 318. The full set of correlated information is provided from the first parallel process 310 to an analytics processor 340.

In the second parallel process 320, the query optimizer 214 identifies whether a specialized DBMS 220, 230, 240 is able to execute the query. Initially the query optimizer 214 fetches data for accelerator eligibility of the query from stored tables in a fetch table step 322. This data determines whether the specialized DBMS 220, 230, 240 are eligible to process the query at all.

Next, the query optimizer 214 determines from the data collector 302 how frequently the query being optimized is run in a gather metrics on frequency step 324. The frequency is determined using saved historical data, and indicates how often this particular query and/or similarly structured queries have been recently run.

Once the frequency of execution has been determined, and the eligibility has been determined, the query being optimized is parsed to gather information on what specific objects (e.g. data elements in the database 250) are being referenced by the query in a gather reference statistics step 326.

For each object referenced in the query the query optimizer 214 determines if a secondary DBMS 220, 230, 240 is available and gathers information on data and table load times from previous queries for objects having similar characteristics as the objects being referenced in the current query.

When a table corresponding to the object has already been loaded, the query optimizer 214 gathers historic metrics regarding table data load cost in a load cost data step 330. Once the load cost has been determined, the query optimizer 214 proceeds to a data gathering step 328.

When a table corresponding to the object is not already loaded, the query optimizer 214 proceeds directly to the data gathering step 328 and gathers Insert/Update/Delete patterns of the query and predicts a synchronization cost based on similar tables.

Once from each of the parallel processes 310, 320 has been performed and output to the analytics processor 340, the analytics processor 340 uses all the gathered data to formulate the eligibility of each specialized DBMS 220, 230, 240 to process the query and the eligibility of each of the specialized processors 222, 232, 234.

The analytics processor determines a recommended processing path for the query. The recommended processing path defines a processor 212, 222, 232, 242 and a DBMS 210, 220, 230, 240 that can most efficiently execute the database query. The recommended path is a factor of query execution frequency, offload savings, cost to load/reload the table data from the primary DBMS 210 to the corresponding secondary DBMS 220, 230, 240, and whether the appropriate data trickle fees and Insert/Update/Delete frequency are present. If one query is eligible to a DBMS 210, 220, 230, 240 and processor 212, 222, 232, 242, by calculating the benefit (cost saving*execution frequency)−the overhead (load/reload cost), the process described herein gives a final decision whether this query should be offloaded to a specialized processor and DBRM or not.

The best DBMS 210, 220, 230, 240 and processor 212, 222, 232, 242 is then output as a recommended processor and DBMS for processing the query in an output step 350 and the query is processed using the recommended processor and DBMS.

By using the process outlined at FIG. 3, the query optimizer 214 is able to determine whether the specialized processors and/or specialized DBMS based on multiple key factors and improves the recommendation(s) for execution of a query or query workload on a specialized system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for processing database queries comprising:

receiving a query at a query optimizer included in a general database management system (DBMS);

determining a suitability of a plurality of specialized processors for executing the query in a first parallel process;

determining a suitability of a plurality of specialized database management systems (DBMS) for processing the query in a second parallel process;

correlating at least one suitable specialized processor and at least one suitable specialized DBMS with the query, wherein the at least one suitable specialized DBMS and the at least one suitable specialized processor are in communication with the general DBMS;

transferring the query to a specialized DBS of the at least one suitable specialized DBMS and a specialized processor of the at least one suitable specialized processor based on the correlation;

wherein the second parallel process comprises:

determining which specialized DBMS of the plurality of specialized DBMS are eligible to process the query;

determining how often each of the eligible specialized DBMS has processed a similarly structured queries;

determining what data elements of a database are being referenced by the query;

determining an estimated processing time of the query for each eligible specialized DBMS based on the data elements being referenced and how often the eligible specialized DBMS has processed the similarly structured queries;

comparing, for each eligible specialized DBMS a combination of a determined access speed including the estimated processing time of the eligible specialized DBMS and a time for transferring the query to the eligible specialized DBMS to an access speed of the general DBMS; and assigning execution of the query to a faster of the eligible specialized DBMSs and the general DBMS based on the comparison.

2. The computer-implemented method of claim 1, wherein determining the suitability of the plurality of specialized processors for executing the query comprises determining a first specialized processor in the plurality of processors is suitable for executing the query, and the method further comprises executing the query using the first specialized processor.

3. The computer-implemented method of claim 1, wherein determining the suitability of the plurality of specialized database management systems (DBMS) for processing the query comprises determining a first specialized DBMS is suitable for processing the query, and the method further comprises executing the query using the first specialized DBMS.

4. The computer-implemented method of claim 1, wherein determining the suitability of the plurality of specialized processors for executing the query and determining the suitability of the plurality of specialized database management systems (DBMS) for processing the query in a second parallel process comprises determining that no specialized processors in the plurality of specialized processors are suitable for executing the query and that no specialized DBMS in the plurality of specialized DBMS are suitable for processing the query, and wherein the method further comprises executing the query using a general processor and processing the query using a general DBMS.

5. The computer-implemented method of claim 1, wherein the query is a workload of query requests, and wherein the workload of query requests are considered as a single query.

6. The computer-implemented method of claim 1, wherein the query optimizer is a software module within a general DBMS.

7. The computer-implemented method of claim 1, wherein the specialized DBMS in the plurality of specialized DBMS include corresponding specialized processors of the plurality of specialized processors.

8. The computer-implemented method of claim 1, wherein the first parallel process identifies sub queries within the query, identifies a source of the sub queries, and identifies a set of characteristics of the sub queries and compares the characteristics of the sub queries to capabilities of the specialized processors.

9. The computer-implemented method of claim 8, wherein the characteristics include a read only status of the sub queries, an input/output (IO) intensity of the sub queries, a processing power requirement of the sub queries, and a presence of extensible markup language (XML) parsing in the sub queries.

10. The computer-implemented method of claim 1, further comprising executing the query using the faster of the eligible specialized DBMS.

11. The computer-implemented method of claim 1, wherein the plurality of specialized processors are correlated with the plurality of specialized DBMS such that each specialized DBMS includes a specialized processors of the plurality of specialized processors.

12. A computer system comprising:

a general database management system (DBMS) including a general processor and a memory, the memory storing a query optimizer module;

at least one specialized DBMS in communication with the general DBMS;

at least one specialized processor in communication with the general DBMS;

the query optimizer module being configured to receive a query;

determining a suitability of the at least one specialized processor for executing the query in a first parallel process;

determining a suitability of the at least one specialized DBMS for processing the query in a second parallel process;

transferring the query to a specialized DBMS of the at least one specialized DBMS and a specialized processor of the at least one specialized processor in response to the at least one specialized processor being suitable and the at least one specialized DBMS being suitable;

wherein the second parallel process comprises:

determining which specialized DBMS of the plurality of specialized DBMS are eligible to process the query;

determining how often each of the eligible specialized DBMS has processed a similarly structured query;

determining what data elements of a database are being referenced by the queries;

determining an estimated processing time of the query for each eligible specialized DBMS based on the data elements being referenced and how often the eligible specialized DBMS has processed similarly structured queries;

comparing, for each eligible specialized DBMS, a combination of a determined access speed including the estimated processing time of the eligible specialized DBMS and a time for transferring the query to the eligible specialized DBMS to an access speed of the general DBMS; and assigning execution of the query to a faster of the eligible specialized DBMSs and the general DBMS based on the comparison.

13. The computer system of claim 12, wherein the at least one specialized processor and the at least one specialized DBMS are correlated such that each specialized DBMS in the at least one specialized DBMS includes a corresponding one of the at least one specialized processors.

14. The computer system of claim 12, wherein the at least one of the at least one specialized processors is independent of the at least one specialized DBMS.

15. The computer system of claim 12, wherein the first parallel process identifies sub queries within the query, identifies a source of the sub queries, and identifies a set of characteristics of the sub queries and compares the characteristics of the sub queries to capabilities of the at least one specialized processor.

16. The computer system of claim 15, wherein the characteristics include a read only status of the sub queries, an input/output (IO) intensity of the sub queries, a processing power requirement of the sub queries, and a presence of extensible markup language (XML) parsing in the sub queries.

17. The computer system of claim 12, further comprising executing the query using the faster of the eligible specialized DBMS.

18. The computer system of claim 12, wherein the at least one specialized processor comprises a plurality of specialized processors.

19. The computer system of claim 12, wherein the at least one specialized DBMS comprises a plurality of specialized DBMS.

20. The computer system of claim 12, wherein the query is a workload of query requests, and wherein the workload of query requests is considered as a single query.

* * * * *